United States Patent
Jain et al.

(10) Patent No.: US 12,124,794 B2
(45) Date of Patent: Oct. 22, 2024

(54) STYLIZING DIGITAL CONTENT

(71) Applicant: Adobe Inc., San Jose, CA (US)

(72) Inventors: Sanyam Jain, New Delhi (IN); Rishav Agarwal, Panathur (IN); Rishabh Purwar, Faridabad (IN); Prateek Gaurav, Lucknow (IN); Palak Agrawal, Mathura (IN); Nikhil Kedia, Noida (IN); Ankit Kumar, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/057,834

(22) Filed: Nov. 22, 2022

(65) Prior Publication Data

US 2024/0169145 A1  May 23, 2024

(51) Int. Cl.
*G06F 40/186* (2020.01)
*G06F 40/109* (2020.01)
*G06T 11/60* (2006.01)
*G06V 30/19* (2022.01)
*G06V 30/413* (2022.01)

(52) U.S. Cl.
CPC .......... *G06F 40/186* (2020.01); *G06F 40/109* (2020.01); *G06T 11/60* (2013.01); *G06V 30/19173* (2022.01); *G06V 30/413* (2022.01)

(58) Field of Classification Search
CPC ...... G06F 40/186; G06F 40/109; G06T 11/60; G06V 30/19173; G06V 30/413
See application file for complete search history.

(56) References Cited

U.S. PATENT DOCUMENTS

| 12,056,453 B2 | 8/2024 | Tambi et al. |
| 2022/0156489 A1 | 5/2022 | Agarwal et al. |
| 2023/0325597 A1 | 10/2023 | Tambi et al. |
| 2023/0376284 A1* | 11/2023 | Shi .......................... G06F 8/10 |

FOREIGN PATENT DOCUMENTS

| CA | 3150535 A1 * | 3/2021 | ......... G06F 16/2457 |
| WO | WO-2022139807 A1 * | 6/2022 | ........... G06F 16/483 |

OTHER PUBLICATIONS

Liu et al. NPL-"Intelligent design of multimedia content in Alibaba", Published 2019 pp. 1657-1664 (Year: 2019).*
Maheshwari et al., ("Exemplar Based Experience Transfer" pp. 673-680-Pubished 2019 (Year: 2019).*
"Detect text in images", Google Cloud Cloud Vision API [retrieved Dec. 19, 2022]. Retrieved from the Internet <https://cloud.google.com/vision/docs/ocr>., 11 Pages.

(Continued)

*Primary Examiner* — Quoc A Tran
(74) *Attorney, Agent, or Firm* — FIG. 1 Patents (57) ABSTRACT

In implementations of systems for stylizing digital content, a computing device implements a style system to receive input data describing digital content to be stylized based on visual styles of example content included in a digital template. The style system generates embeddings for content entities included in the digital content using a machine learning model. Classified content entities are determined based on the embeddings using the machine learning model. The style system generates an output digital template that includes portions of the digital content having the visual styles of example content included in the digital template based on the classified content entities.

20 Claims, 10 Drawing Sheets

(56) References Cited

OTHER PUBLICATIONS

"Structural Analysis and Shape Descriptors", Open Source Computer Vision [retrieved Dec. 19, 2022]. Retrieved from the Internet <https://docs.opencv.org/4.x/d3/dc0/group_imgproc_shape.html#/gadf1ad6a0b82947fa1fe3c3d497f260e0>., 26 Pages.

Jain, Sanyam, et al., "US Application as Filed", U.S. Appl. No. 18/057,834, filed Nov. 22, 2022, 45 pages.

Nayak, Pandu, et al., "Introduction to Information Retrieval", Lecture 6: Scoring, Term Weighting and the Vector Space Model [retrieved Dec. 19, 2022]. Retrieved from the Internet <https://web.stanford.edu/class/cs276/19handouts/lecture6-tfidf-6per.pdf>., 8 Pages.

Tambi, Ritiz, et al., "US Application as Filed", U.S. Appl. No. 17/658,855, filed Apr. 12, 2022, 52 pages.

Wang, Zhangyang, et al., "DeepFont: Identify Your Font from an Image", Proceedings of the 23rd ACM International conference on Multimedia (MM '15). Association for Computing Machinery, New York, NY [retrieved Dec. 19, 2022]. Retrieved from the Internet <https://arxiv.org/pdf/1507.03196.pdf>., Jul. 12, 2015, 9 pages.

\* cited by examiner

STATEMENT OF PROFIT AND LOSS

FOR THE YEAR ENDING MARCH 31, 2020

| Particulars | Note No. | For the year ended March 31, 2020 | For the year ended March 31, 2019 | Change % |
|---|---|---|---|---|
| Income | | | | |
| Sale of products | 26 | 9,175.76 | 8,367.72 | 10 |
| Other operating income | 26 | 70.77 | 43.99 | 61 |
| Other from operations | 27 | 155.83 | 132.58 | 18 |
| Total Income | | 10,302.38 | 8,544.24 | 8 |
| EXPENSES | | | | |
| Cost of materials consumed | | 5,000.00 | 4,500.00 | 11 |
| Employee benefits expense | | 589.39 | 193.98 | 53 |
| Finance Costs | | 1,079.45 | 95.96 | 22 |
| Total Expenses | | 6,368.09 | 5,587.92 | 14 |
| Total tax after expense | | 3,833.82 | 3,056.32 | 7 |
| Net profitWW after tax | | 2763.87% | 2769.64% | 7 |

STYLIZING DIGITAL CONTENT

BACKGROUND

A digital template is typically created by a digital artist as including example content having a particular visual style or theme. The digital template is made available to users, for example, as part of a database of digital templates available via a network. A user identifies the digital template (e.g., by searching the database), and the user completes the digital template by replacing the example content with the user's content. Once completed, the digital template includes the user's content having the particular visual style or theme that was created by the digital artist.

SUMMARY

Techniques and systems for stylizing digital content are described. In an example, a computing device implements a style system to receive input data describing digital content to be stylized based on visual styles of example content included in a digital template. For instance, the digital content is content of a user which has a visual style that is not aesthetically pleasing, and the user identifies the digital template because the visual styles of the example content are visually pleasing.

For example, the style system generates embeddings for content entities included in the digital content using a machine learning model. In this example, classified content entities are determined based on the embeddings using the machine learning model. The style system generates an output digital template that includes portions of the digital content having the visual styles of the example content included in the digital template based on the classified content entities.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Digital templates are created by artists as having example substantive content such as images or text with visual styles that are aesthetically pleasing. The digital templates are then made available to users as part of a collection of templates. For example, a user identifies a digital template as having example content that is stylized to be visually pleasing.

The user attempts to complete the digital template by replacing the example content with digital content of the user which is frequently challenging. For instance, the digital template includes two example images and the digital content includes a single image or the digital content includes two separate text elements and digital template includes example text of a single text element. In these scenarios, the user is forced to abandon the digital template and search for another digital template in the collection which is tedious and inefficient.

In order to overcome these limitations, techniques and systems for stylizing digital content are described. In one example, a computing device implements a style system to receive input data describing digital content to be stylized based on visual styles of example content included in a digital template and/or visual styles included in a style package that defines appearance properties for categories of digital content. The style system processes the input data using a machine learning model such as a transformer-over-transformer model that includes a base transformer model and a top transformer model.

For example, the style system implements the base transformer model to processes windows of content entities included in the digital content and generate embeddings for the content entities included in the windows. Examples of content entities include text (e.g., headings, bodies, or lists), digital images, tables, vector objects, and so forth. The base transformer model generates an embedding for each content entity included in the digital content. In an example, the embeddings represent context within the content entities.

The style system implements the top transformer model to determine classified content entities based on the embeddings. In one example, the top transformer model determines the classified content entities based on context between the content entities. Possible classes of the classified content entities include heading, body, list, etc.

In a first example, the style system generates an output digital template that includes portions of the digital content having the visual styles of the example content based on the classified content entities. In this first example, the style system identifies classifications of the example content based on tags or metadata of the digital template. In a second example, the style system generates an output digital template that includes portions of the digital content having the visual styles included in the style package based on the classified content entities.

For example, the style system generates the output digital templates automatically or based on user inputs specified by the user though interaction with an input device (e.g., a mouse, a stylus, a keyboard, a touchscreen, etc.). The output digital templates display portions of the digital content in visually pleasing styles, and the style system is capable of stylizing all of the digital content in this manner or subsets of the digital content. This functionality is not possible in conventional systems that are limited to modifying a visual style based on rigid rule-based techniques. Further, it is possible using the described systems for stylizing digital content to generate additional output digital templates that include portions of the digital content having different visual styles. To do so in one example, the user interacts with the input device to select a different style package or a different digital template to generate the additional output digital templates with portions of the digital content having different visual effects/appearances which is also not possible using conventional systems and techniques.

By leveraging the transformer-over-transformer model to classify content entities and then automatically stylizing digital content based on the classifications, the described systems for stylizing digital content are capable of simultaneously generating multiple versions of the digital content each having a different visual style. These different styles are all visually pleasing because the styles are mapped between content entities having a same classification. This is an improvement relative to conventional rule-based systems that apply one style to all classes of content entities which may or may not be visually pleasing. As a result, an experience of a user stylizing digital content is improved by the described systems such that the user is presented with different versions of the digital content that are each visually pleasing rather than with one different version of the digital content as in conventional rule-based systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

Figure 1:
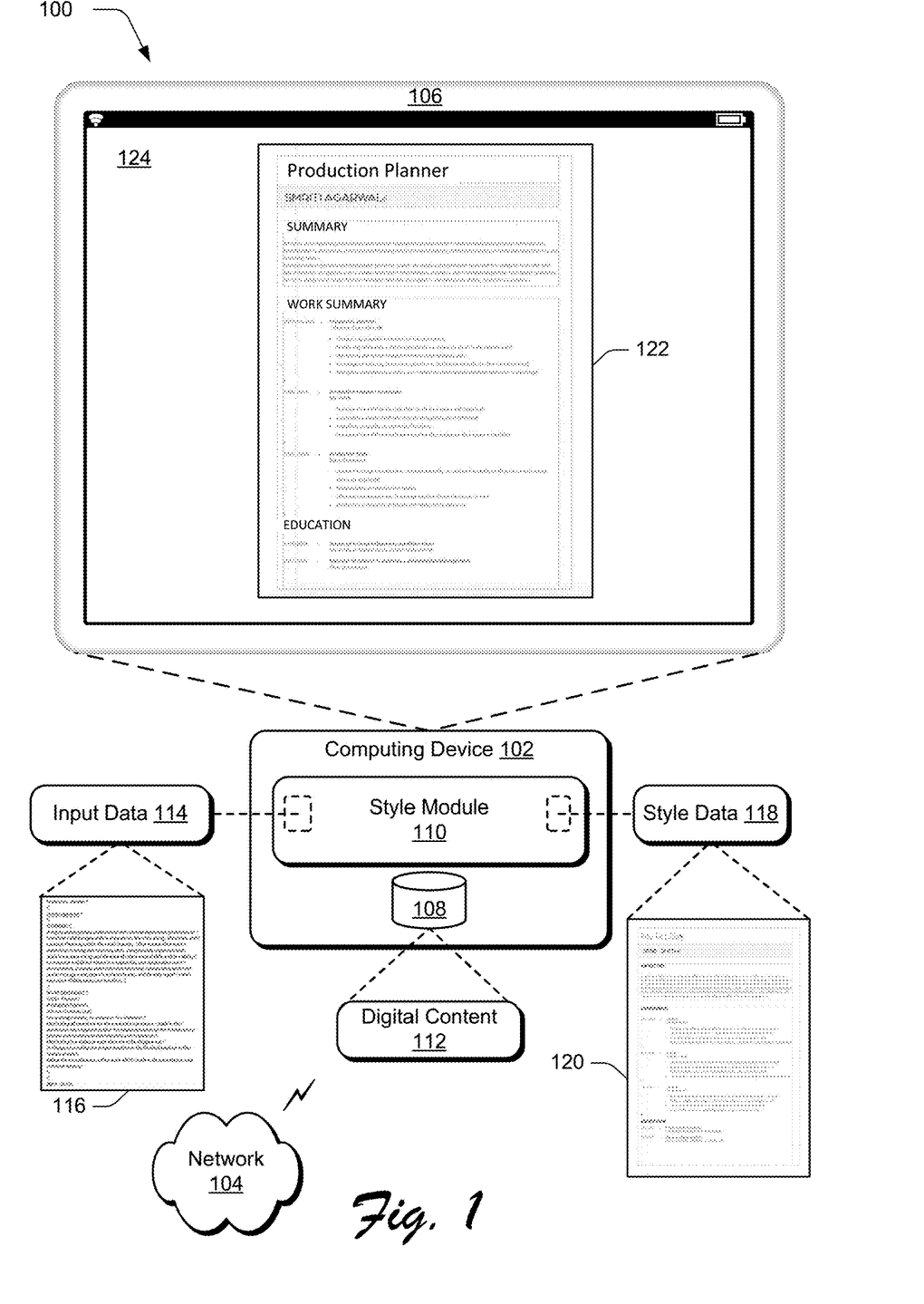
FIG. 1 is an illustration of an environment in an example implementation that is operable to employ digital systems and techniques for stylizing digital content as described herein.

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a style module 110. The storage device 108 is illustrated to include digital content 112 such as digital images, electronic documents, digital templates, font files of fonts, digital artwork, etc.

The style module 110 is illustrated as having, receiving, and/or transmitting input data 114. For instance, the input data 114 describes digital content 116 to be stylized. As shown, the digital content 116 to be stylized is an electronic document that includes unformatted text of a resume of a "Production Planner." All of the unformatted text is left justified and rendered using a default font which is not aesthetically pleasing. In the illustrated example, the resume depicted in the digital content 116 is generally arranged in sections such as a "SUMMARY" section, a "WORK SUMMARY" section, and an "EDUCATION" section. However, in this example, the digital content 116 to be stylized is untagged and does not include any metadata or other data usable to identify the sections of the resume.

Consider an example in which a user interacts with an input device (e.g., a mouse, a stylus, a keyboard, a touchscreen, etc.) to transmit the input data 114 to the style module 110 via the network 104. In this example, the style module 110 receives and processes the input data 114 to stylize the digital content 116. To do so in one example, the style module 110 processes the digital content 116 to be stylized using a machine learning model.

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

In an example, the style module 110 processes the digital content 116 using a machine learning model that includes a transformer-over-transformer model trained on training data to classify content entities included in digital content such as the digital content 112. In this example, the transformer-over-transformer model includes a base transformer model that generates embeddings for content entities included in the digital content 116 to be stylized by processing windows of the content entities. For example, the embeddings capture context within the content entities.

The transformer-over-transformer model also includes a top transformer model that determines classified content entities based on the embeddings. In one example, the top transformer model determines the classified content entities by attending to the embeddings to capture context between content entities included in the windows. Possible classes of the classified content entities include a heading, a body, a list, etc.

The style module 110 is illustrated as having, receiving, and/or transmitting style data 118. In some examples, the style data 118 describes visual styles of example content included in a digital template 120. In other examples, the style data 118 describes visual styles included in style packages that define appearance properties for categories of digital content such as text, tables, digital images, vector objects, and so forth.

For example, the user interacts with the input device to transmit the style data 118 to the style module 110 as describing the visual styles of example content included in the digital template 120. As shown, the digital template 120 is a template for a resume that includes an "ABOUT ME" section, an "EXPERIENCE" section, and an "EDUCATION" section. As further shown, the visual styles of the example content in the digital template 120 include glyphs of text rendered using different fonts which have complimentary appearance features that are visually pleasing. For instance, the digital template 120 was created by a digital artist that selected the different fonts from a font database including thousands of fonts which is available via the network 104. In one example, the digital template 120 was selected by the user (via interaction with the input device) from a template database including thousands of different templates which is also available via the network 104.

The style module 110 leverages tags or metadata of the digital template 120 to identify classifications of the example content having the visual styles and the classified content entities determined from the digital content 116 to generate an output digital template 122 which is displayed in a user interface 124 of the display device 106. As illustrated in FIG. 1, the output digital template 122 includes portions of the digital content 116 having the visual styles of the example content included in the digital template 120. For example, the "SUMMARY" section of the resume depicted in the digital content 116 has a visual style of the "ABOUT ME" section from the digital template 120. Similarly, the "WORK SUMMARY" section has a visual style of the "EXPERIENCE" section and the "EDUCATION" section from the digital content 116 has a visual style of the "EDUCATION" section included in the digital template 120.

Unlike the resume depicted in the digital content 116 that is not visually pleasing, the resume included in the output digital template 122 is aesthetically pleasing and includes the content from the digital content 116 having the visual styles of the example content included in digital template 120. In one example, the user interacts with the input device relative to the user interface 124 to edit the output digital template 120. In another example, the user interacts with the input device relative to the user interface 124 to select the output digital template 120, e.g., for submission to potential employers.

Figure 2:
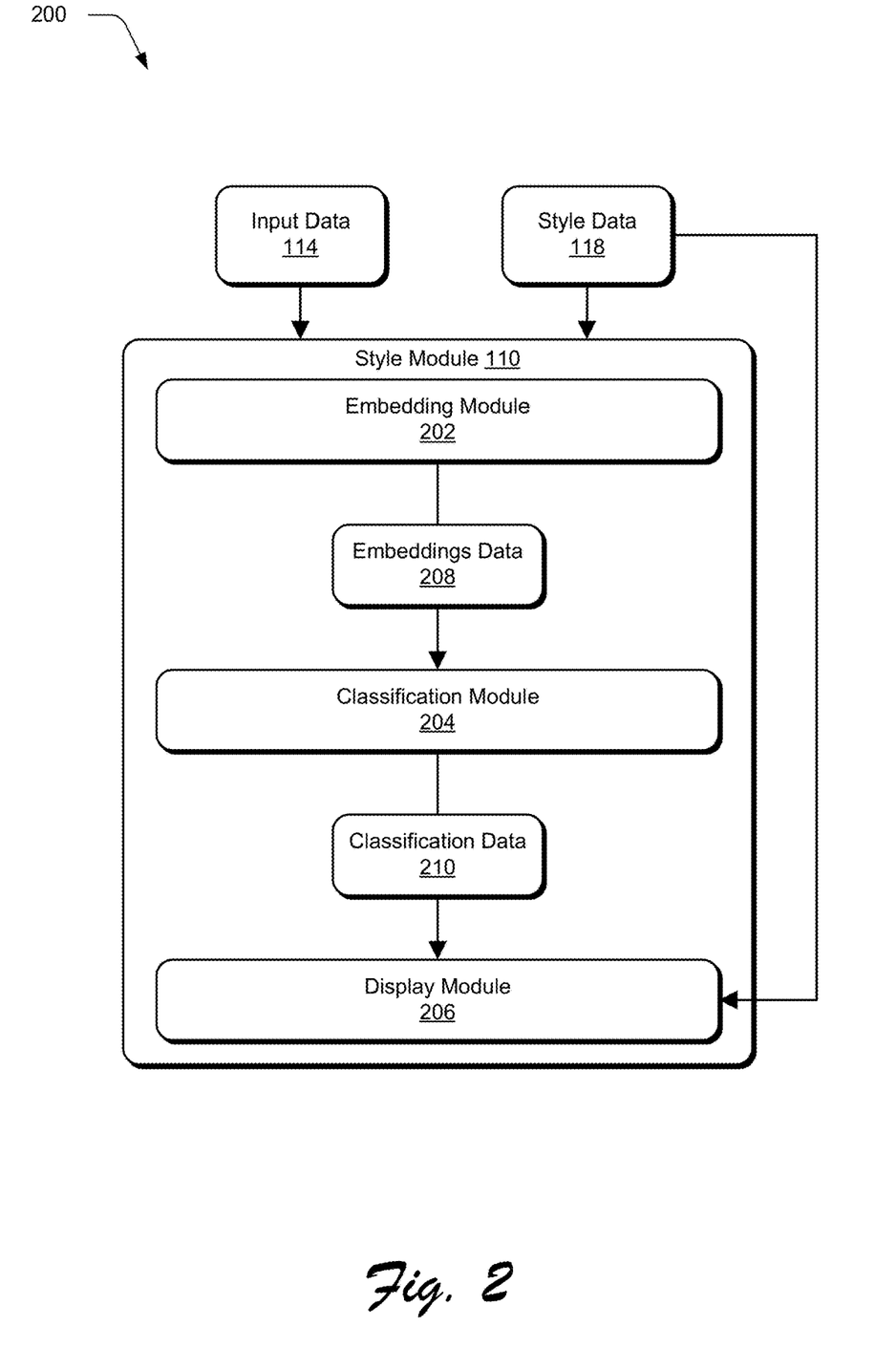
FIG. 2 depicts a system in an example implementation showing operation of a style module for stylizing digital content.

FIG. 2 depicts a system 200 in an example implementation showing operation of a style module 110 for stylizing digital content. The style module 110 is illustrated to include an embedding module 202, a classification module 204, and a display module 206. In an example, the embedding module 202 receives and processes the input data 114 to generate embeddings data 208.

Figure 3:
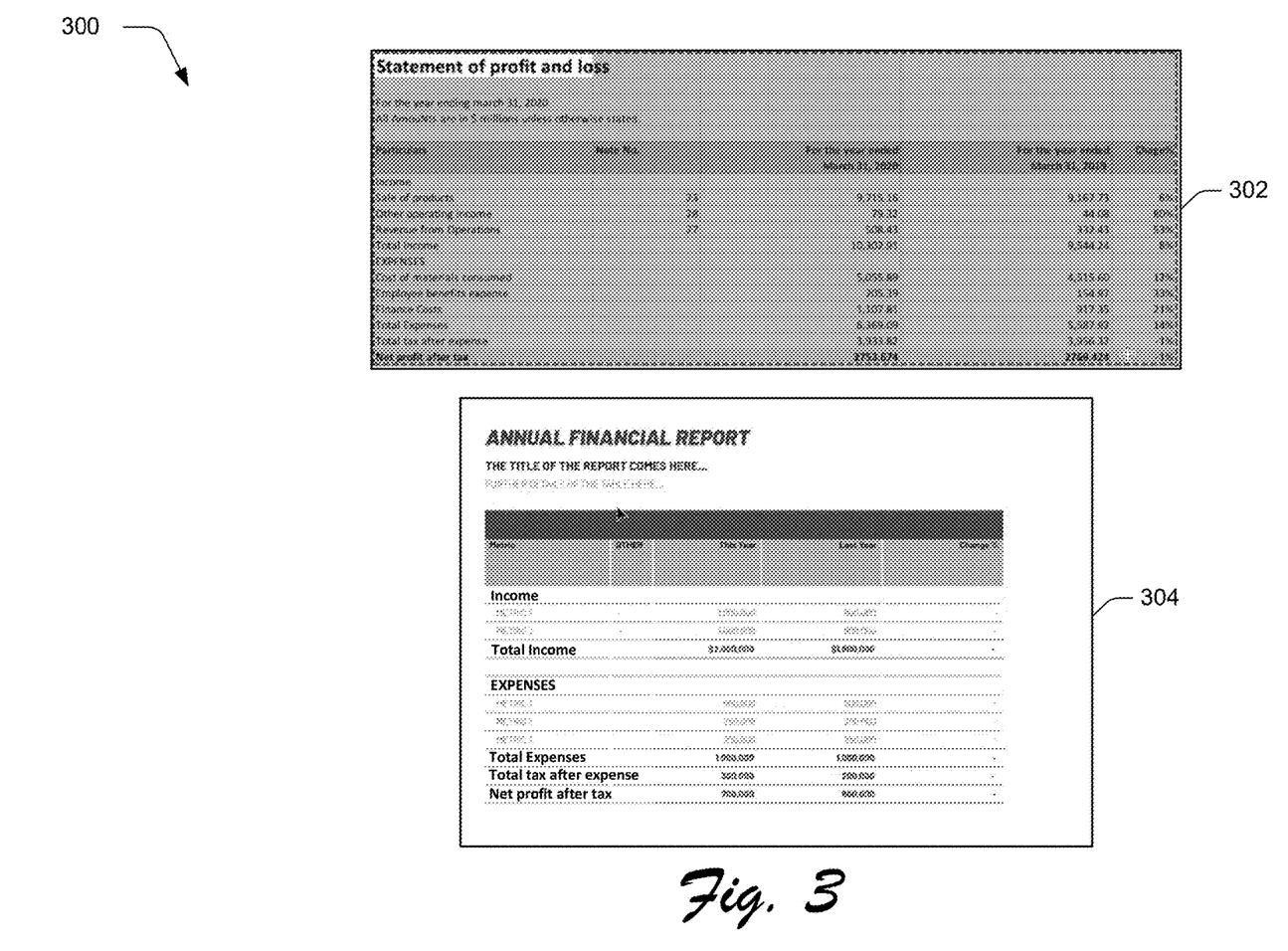
FIG. 3 illustrates a representation of digital content to be stylized and a digital template.

FIG. 3 illustrates a representation 300 of digital content to be stylized and a digital template. The representation 300 includes digital content 302 and a digital template 304. For instance, the digital content 302 is an electronic spreadsheet illustrating a "Statement of profit and loss." The electronic spreadsheet includes minimal formatting, for example, a row of categories is highlighted and a bottom-line row is highlighted. All numerals and text included in the digital content 302 are rendered using a default font with a title, text/numerals in the row of categories, and text/numerals in the bottom-line row rendered using a bold font face of the default font. The digital content 302 is not visually pleasing and difficult to view.

The digital template 304 is a template for an annual financial report. As shown, the digital template 304 includes example text content rendered using different fonts with complimentary visual features. Some of the example text content included in the digital template 304 is displayed in different colors which visually differentiates between rows of the digital template 304 that present standalone example content and rows of the digital template 304 that present summaries (e.g., numerical sums) of the example content. Unlike the digital content 302, the digital template 304 is aesthetically pleasing and easy to view.

For example, the input data 114 describes the digital content 302 and the style data 118 describes the digital template 304. As previously described, the style module 110 includes a machine learning model such as a transformer-over-transformer model which includes a base transformer model and a top transformer model. The transformer-over-transformer model is trained on weak-labeled training data generated from samples in a target domain in a 90-10 split for training and validation, respectively. In one example, the embedding module 202 includes the base transformer model and the classification module 204 includes the top transformer model. In this example, the base transformer model is implemented using Bidirectional Encoder Representations from Transformers (BERT).

For instance, the base transformer model is pretrained on training data describing a corpus of non-domain specific text and includes 12 layers and 12 attention heads with 768 embedding dimensions. The embedding module 202 implements the base transformer model to process windows of content entities described by the input data 114 (e.g., sentences or paragraphs) to generate embeddings which capture context within the content entities. For example, the base transformer model generates one embedding for each of the content entities.

The top transformer model includes two transformer inter-encoder layers with dimensions of 768 followed by a softmax layer. In an example, the two transformer inter-encoder layers attend over the embeddings generated by the base transformer model and the softmax layer outputs a prediction. The prediction is a classification of a content entity as either heading, body, or list. For example, the classification module 204 implements the top transformer model to determine classified content entities based on context between content entities included in the windows.

In an example, the embedding module 202 receives the input data 114 describing the digital content 302, and the embedding module 202 implements the base transformer model to process windows of content entities included in the digital content 302. The base transformer model generates embeddings for content entities included in the windows and the embedding module 202 generates the embeddings data 208 as describing the embeddings generated for the content entities. For instance, the classification module 204 receives the embeddings data 208, and the classification module 204 implements the top transformer model to classify the content entities included in the digital content 302. The top transformer model determines classified content entities based on the embeddings data 208, and the classification module 204 generates classification data 210 as describing the classified content entities included in the digital content 302.

Figure 4:
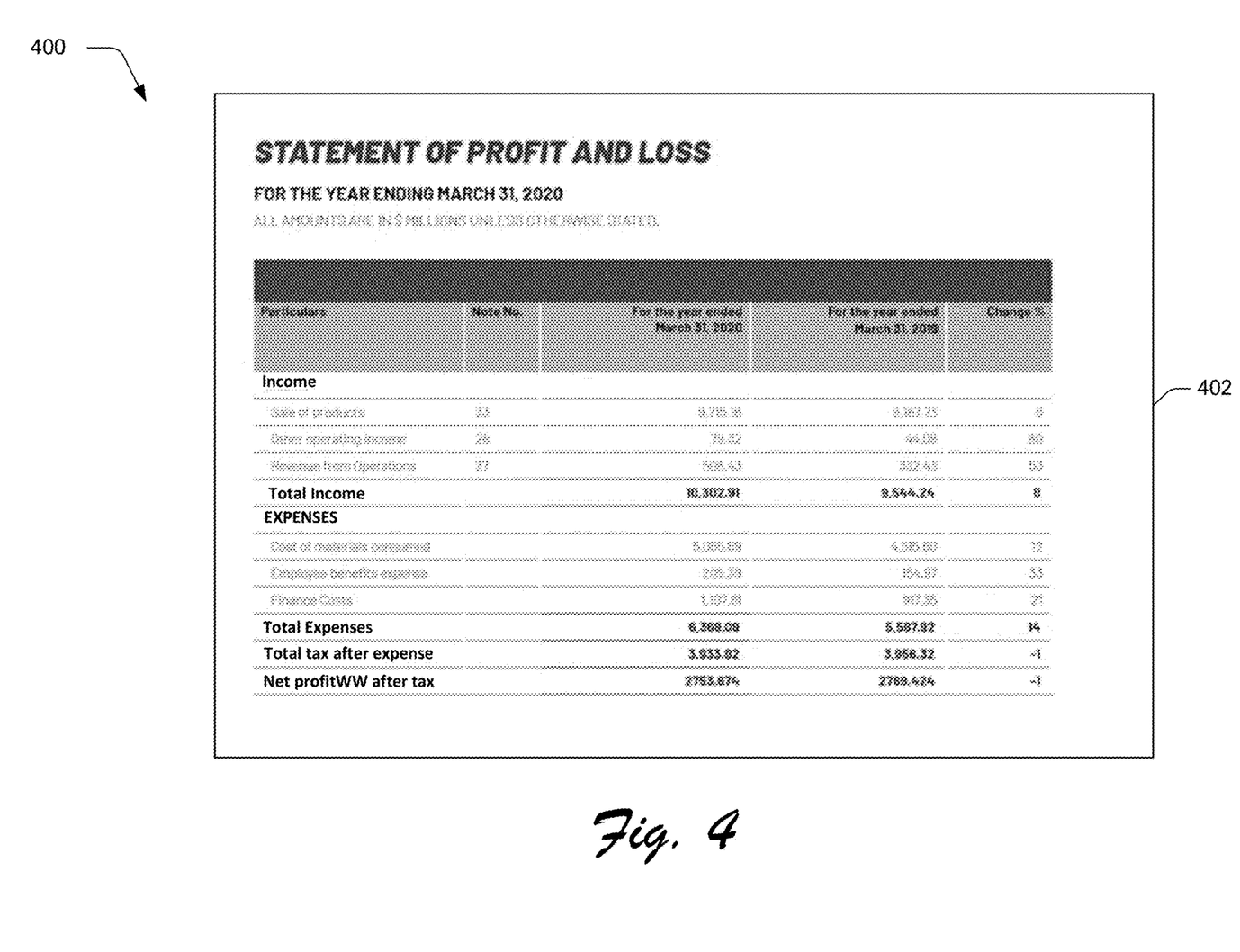
FIG. 4 illustrates a representation of an output digital template generated based on a digital template.

The display module 206 receives the classification data 210 and the style data 118 describing the digital template 304. In an example, the display module 206 processes the style data 118 to determine classifications of the example content included in the digital template 304 (e.g., using tags and/or metadata of the digital template 304). FIG. 4 illustrates a representation 400 of an output digital template generated based on a digital template.

The display module 206 processes the classification data 210 describing the classified content entities included in the digital content 302 and the style data 118 describing the digital template 304 to generate an output digital template 402. As shown in FIG. 4, the output digital template 402 includes portions of the digital content 302 having visual styles of the example content included in the digital template 304. Like the digital template 304 (and unlike the digital content 302), the output digital template 402 is aesthetically pleasing and easy to view. All numerals and text included in the digital content 302 are rendered using visually pleasing fonts and displayed in different colors and different sizes in the output digital template 402 which conveys a professional visual appearance that is not conveyed in the digital content 302.

Figure 5:
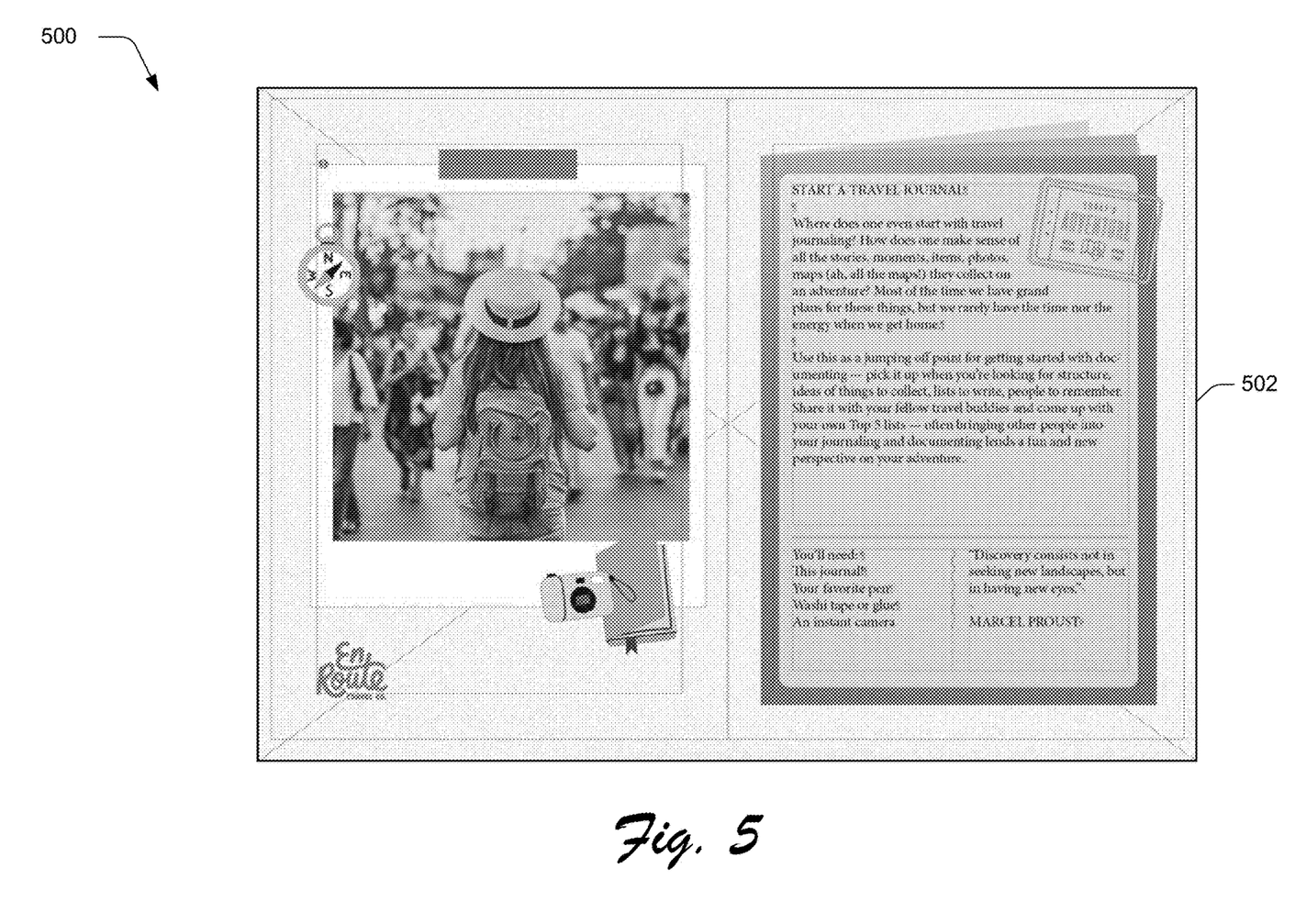
FIG. 5 illustrates a representation of digital content to be stylized.

FIG. 5 illustrates a representation 500 of digital content to be stylized. The representation 500 includes digital content 502 which is to be stylized using a style package. For example, the input data 114 describes the digital content 502 and the style data 118 describes the style package. As shown, the digital content 502 is a digital template that includes a digital image depicting a traveler, a vector object depicting a compass, a vector object depicting a camera, a table, and text within the table with a title of "START A TRAVEL JOURNAL." The text is rendered with a default font in a single size. Portions of the digital content 502 are visually pleasing; however, the text within the table is not visually pleasing.

For example, the embedding module 202 receives the input data 114 as describing the digital content 502, and the embedding module 202 implements the base transformer model to generate embeddings for content entities included in the digital content 502. In this example, the embedding module 202 generates the embeddings data 208 as describing the embeddings generated by the base transformer model. The classification module 204 receives the embeddings data 208, and the classification module 204 implements the top transformer model to determine classified content entities based on the embeddings data 208. The classification module 204 generates the classification data 210 as describing the classified content entities included in the digital content 502.

For instance, the display module 206 receives the classification data 210 describing the classified content entities and the style data 118 describing the style package. The style package includes a visual style or multiple visual styles. For example, each visual style included in the style package represents different appearance properties of a category of digital content or multiple categories of digital content. Examples of categories of digital content include text (e.g., characters, sentences, paragraphs/bodies, headings, lists, etc.), tables, digital images, vector objects, and so forth. For example, the style package represents a collection of coherent visual styles.

In one example, a visual style included in the style package is based on a font or multiple fonts and defined appearance properties (e.g., colors, sizes, alignments, etc.) for glyphs of text rendered using the font or the multiple fonts. In another example, a visual style included in the style package for digital images defines appearance properties (e.g., presets, filters, borders, edits, and so forth) for a digital image to be stylized (e.g., the digital image included in the digital content 502). In some examples, visual styles included in the style package are extracted from a digital template or a database of thousands of different digital templates available via the network 104. In an example, the style package is selected from a database of thousands of different style packages available via the network 104.

Figure 6:
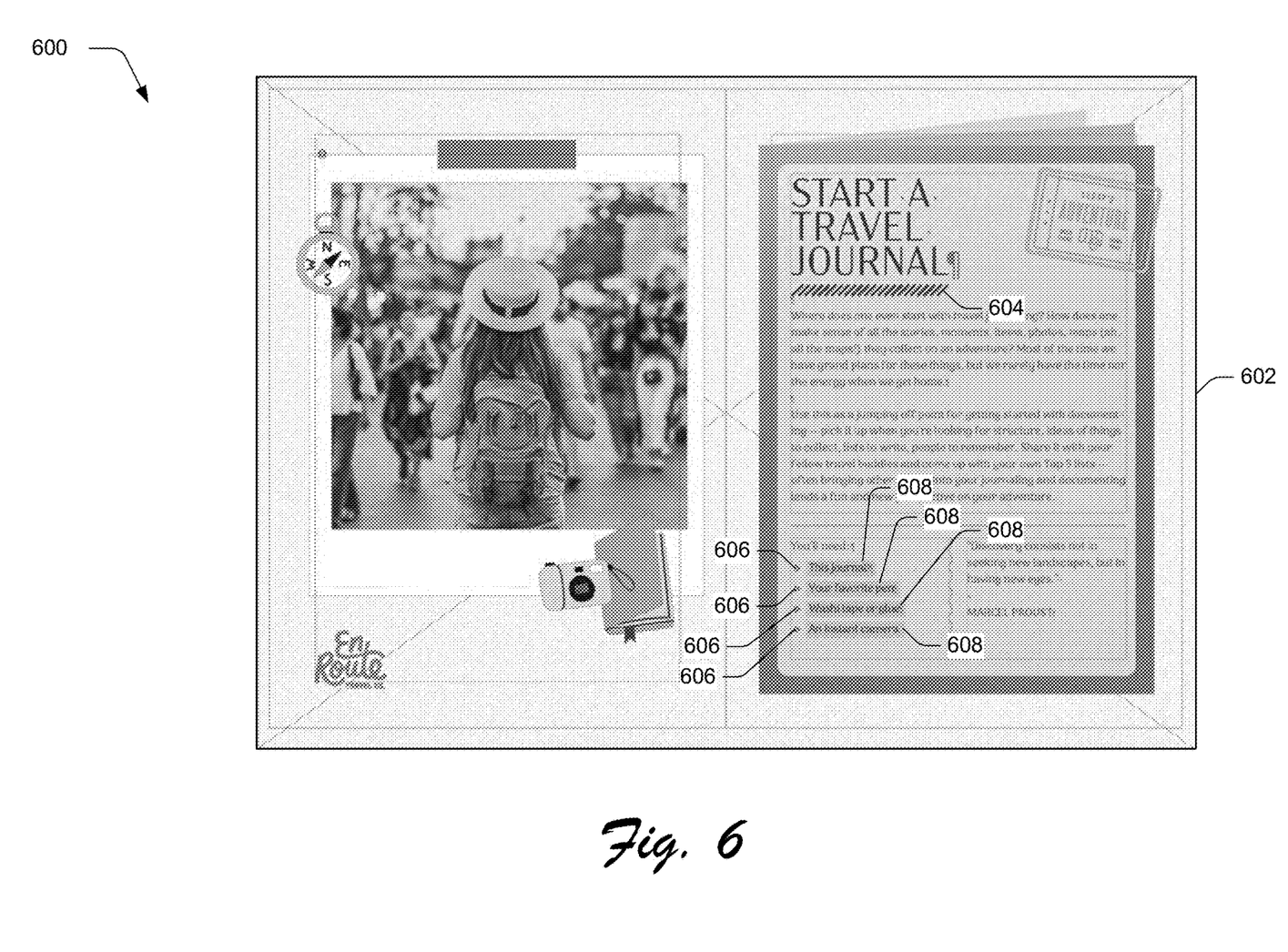
FIG. 6 illustrates a representation of a digital template generated based on a style package.

FIG. 6 illustrates a representation 600 of a digital template generated based on a style package. For example, the display module 206 processes the classification data 210 describing the classified content entities included in the digital content 502 and the style data 118 describing the visual styles included in the style package to generate a digital template 602. As shown, the digital template 602 includes the text within the table having visual styles included in the style package (which was not visually pleasing in the digital content 502).

In the digital template 602, the title of "START A TRAVEL JOURNAL" is rendered using a font at a size which is larger than a size of text in a body of the table. The display module 206 has added a stylistic element 604 defined in the style package which is included below the title of "START A TRAVEL JOURNAL" in the digital template 602. For example, the display module 206 has added bullets 606 included and defined in the style package to text in the table classified as a list. In this example, highlights 608 included and defined in the style package are added to elements of the text in the table classified as the list.

By leveraging the style package (or an additional style package), the display module 206 is capable of improving a visual appearance of the text in the table via paragraph shading, breaks, columns, scaling, kerning, indents, and so forth. For instance, the text in the table of the digital template 602 has an improved visual appearance in relation to the text in the table of the digital content 502. However, the portions of the digital content 502 which were already visually pleasing are unchanged in the digital template 602. Accordingly, the display module 206 is capable of stylizing all of the digital content 502 or subsets of the digital content 502 which is performable automatically or via user inputs (generated by the user through interaction with the input device). This functionality is not possible in conventional systems that are limited to modifying a visual style based on rigid rule-based techniques. When the user reviews the digital template 602 based on the user's aesthetic judgment, it is possible for the user to interact with the input device to select a different style package to cause the text in the table of the digital content 502 to have different visual effects/appearances which is also not possible using conventional systems and techniques.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 7:
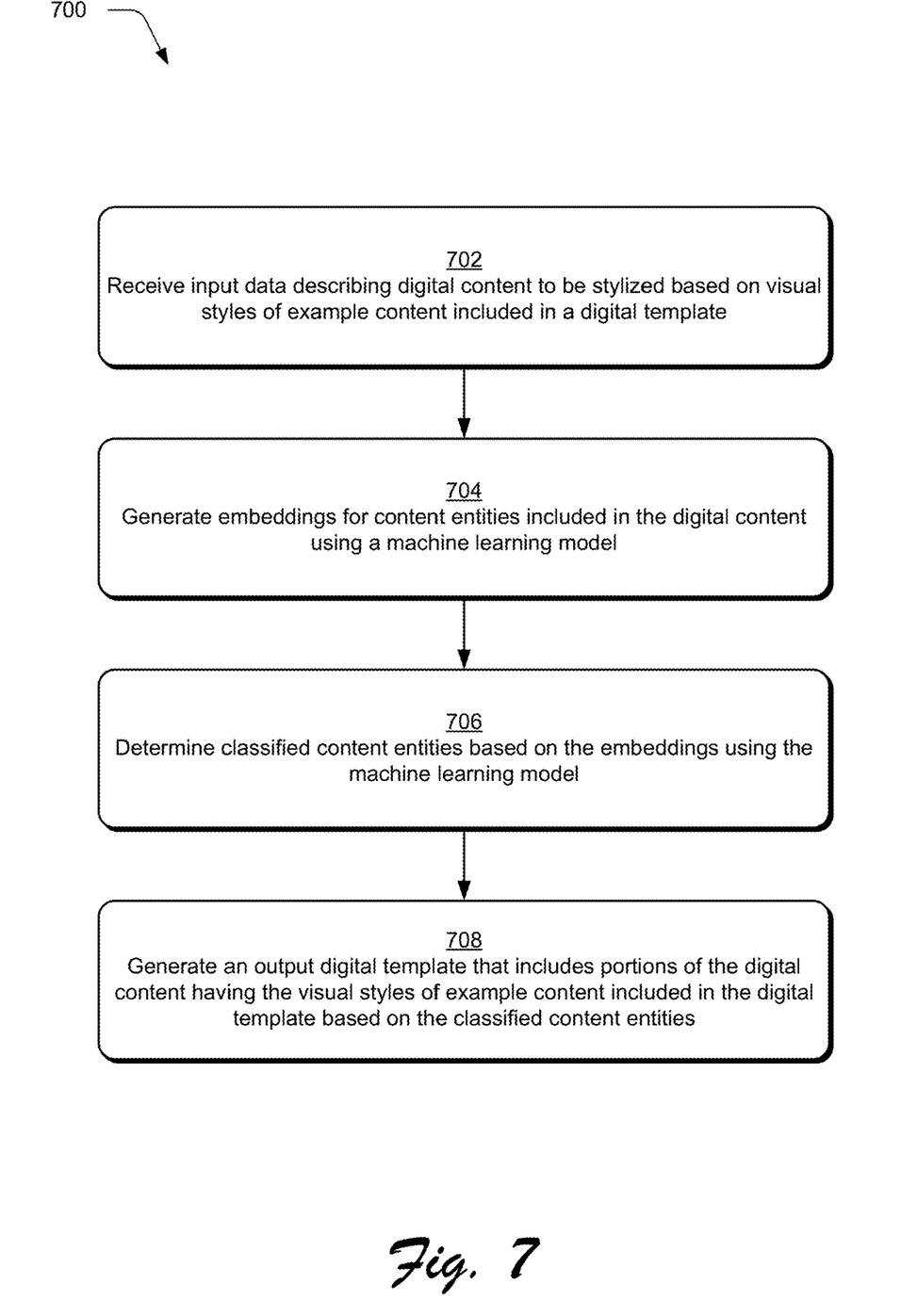
FIG. 7 is a flow diagram depicting a procedure in an example implementation in which an output digital template is generated that includes portions of digital content having visual styles of example content included in a digital template.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6. FIG. 7 is a flow diagram depicting a procedure 700 in an example implementation in which an output digital template is generated that includes portions of digital content having visual styles of example content included in a digital template.

Input data is received describing digital content to be stylized based on visual styles of example content included in a digital template (block 702). In one example, the computing device 102 implements the style module 110 to receive the input data. Embeddings are generated for content entities included in the digital content using a machine learning model (block 704). The style module 110 generates the embeddings for the content entities in some examples.

Classified content entities are determined based on the embeddings using the machine learning model (block 706). For example, the computing device 102 implements the style module 110 to determine the classified content entities. An output digital template is generated that includes portions of the digital content having the visual styles of example content included in the digital template based on the classified content entities (block 708). In an example, the style module 110 generates the output digital template.

Figure 8:
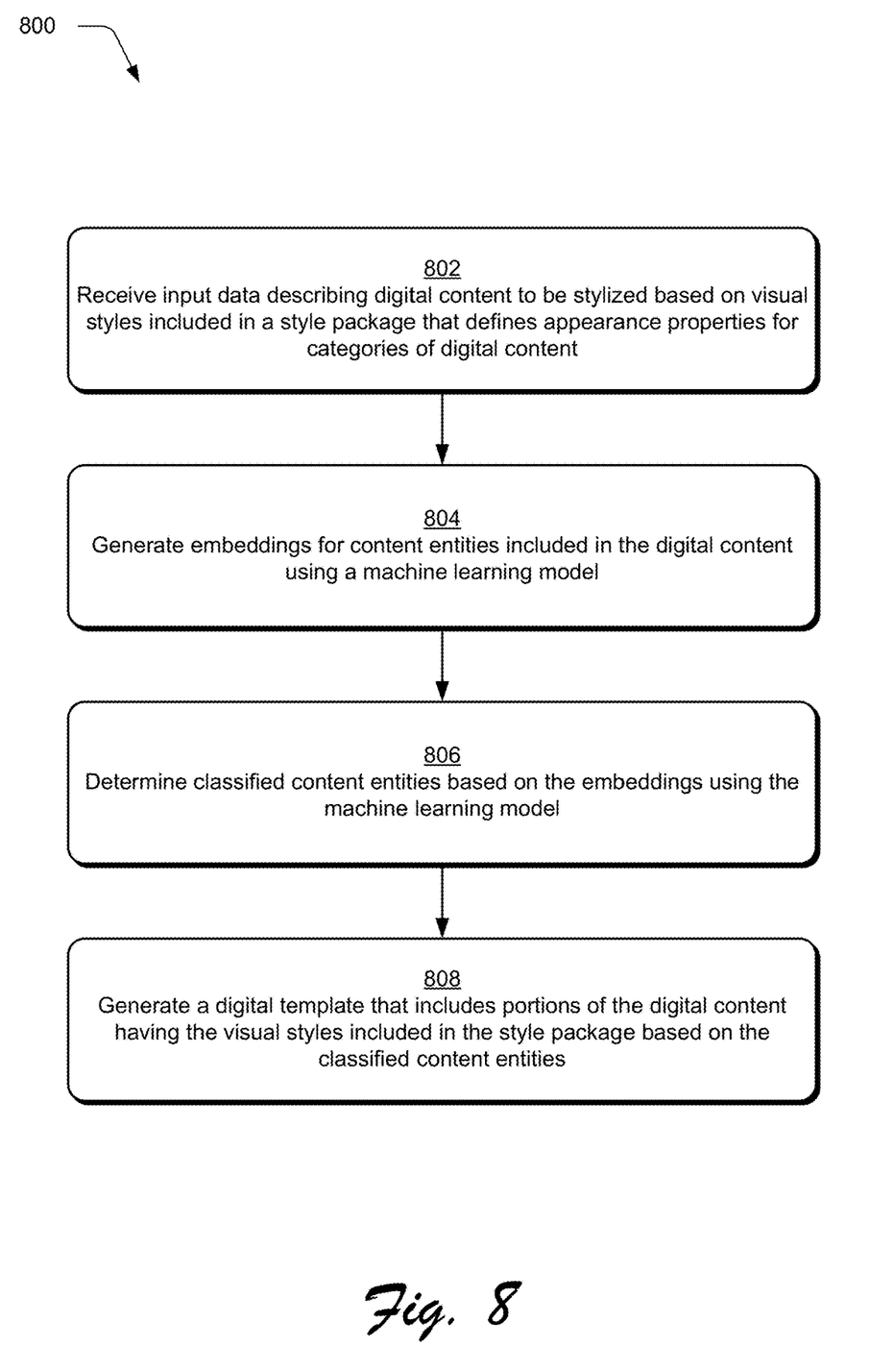
FIG. 8 is a flow diagram depicting a procedure in an example implementation in which a digital template is generated that includes portions of digital content having visual styles included in a style package.

FIG. 8 is a flow diagram depicting a procedure 800 in an example implementation in which a digital template is generated that includes portions of digital content having visual styles included in a style package. Input data is received describing digital content to be stylized based on visual styles included in a style package that defines appearance properties for categories of digital content (block 802). For example, the computing device 102 implements the style module 110 to receive the input data.

Embeddings are generated for content entities included in the digital content using a machine learning model (block 804). In some examples, the style module 110 generates the embeddings for the content entities. Classified content entities are determined based on the embeddings using the machine learning model (block 806). In an example, the style module 110 determines the classified content entities. A digital template is generated that includes portions of the digital content having the visual styles included in the style package based on the classified content entities (block 808). In one example, the style module 110 generates the digital template.

Figure 9:
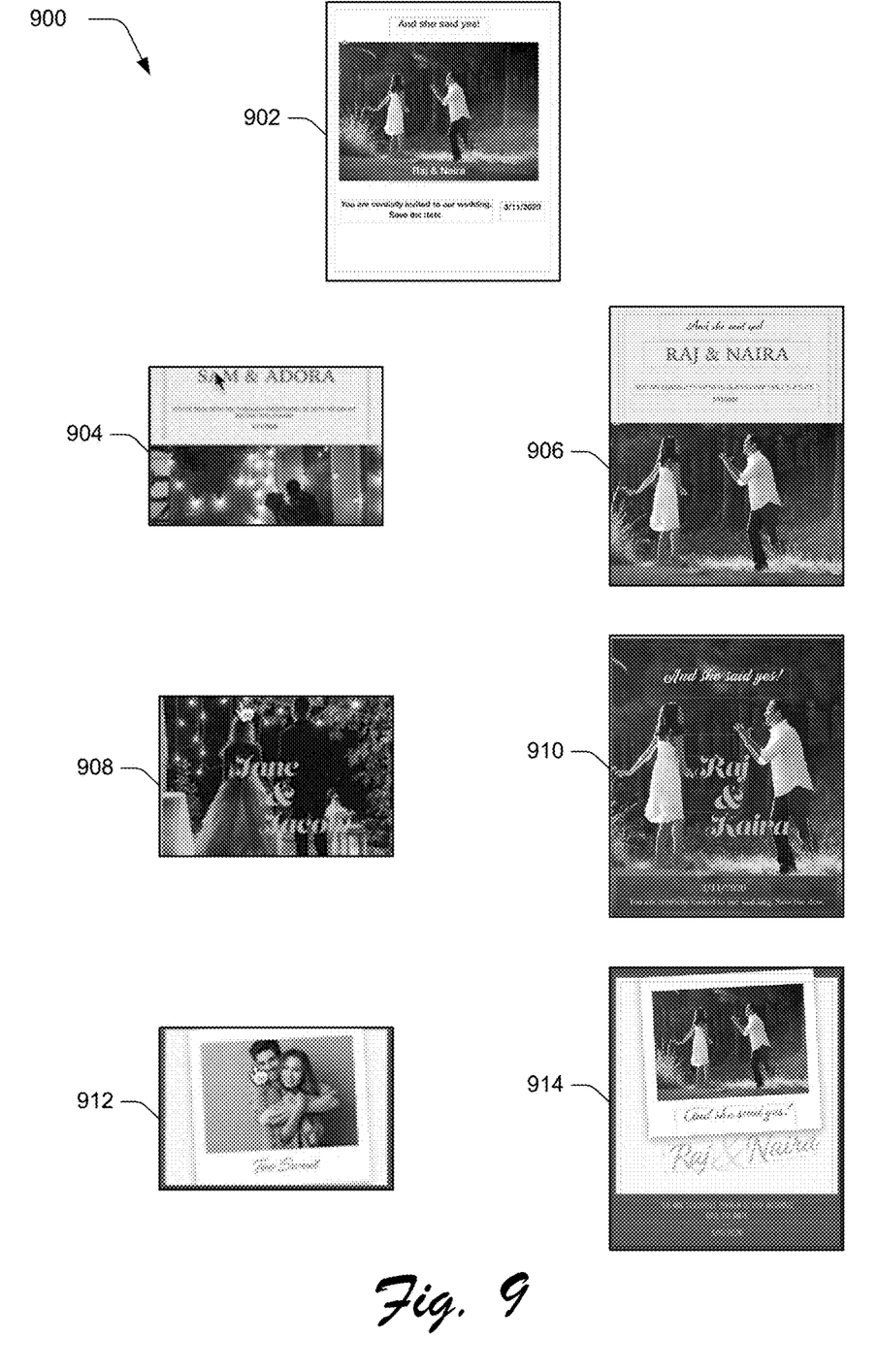
FIG. 9 illustrates a representation of examples of automatically stylized digital content.

FIG. 9 illustrates a representation 900 of examples of automatically stylized digital content. As shown, the representation 900 includes digital content 902 which depicts a wedding invitation. For example, the style module 110 receives the input data 114 describing the digital content 902 and the style module 110 receives the style data 118 describing a digital template 904. The style module 110 processes the input data 114 and the style data 118 to generate and output digital template 906. For instance, the output digital template 906 includes portions of the digital content 902 having visual styles of example content included in the digital template 904.

In another example, the style module 110 receives the input data 114 describing the digital content 902 and receives the style data 118 describing a digital template 908. For example, the style module 110 processes the input data 114 and the style data 118 to generate an output digital template 910. As illustrated in FIG. 9, the output digital template 910 includes portions of the digital content 902 having visual styles of example content included in the digital template 908.

In a third example, the style module 110 receives the input data 114 describing the digital content 902, and the style module 110 receives the style data 118 describing a digital template 912. In this example, the style module 110 processes the input data 114 and the style data 118 to generate an output digital template 914 that includes portions of digital content 902 having visual styles of example content included in the digital template 912. Each of the output digital templates 906, 910, 914 has an improved visual appearance in relation to a visual appearance of the digital content 902 which is not visually pleasing.

Example System and Device

Figure 10:
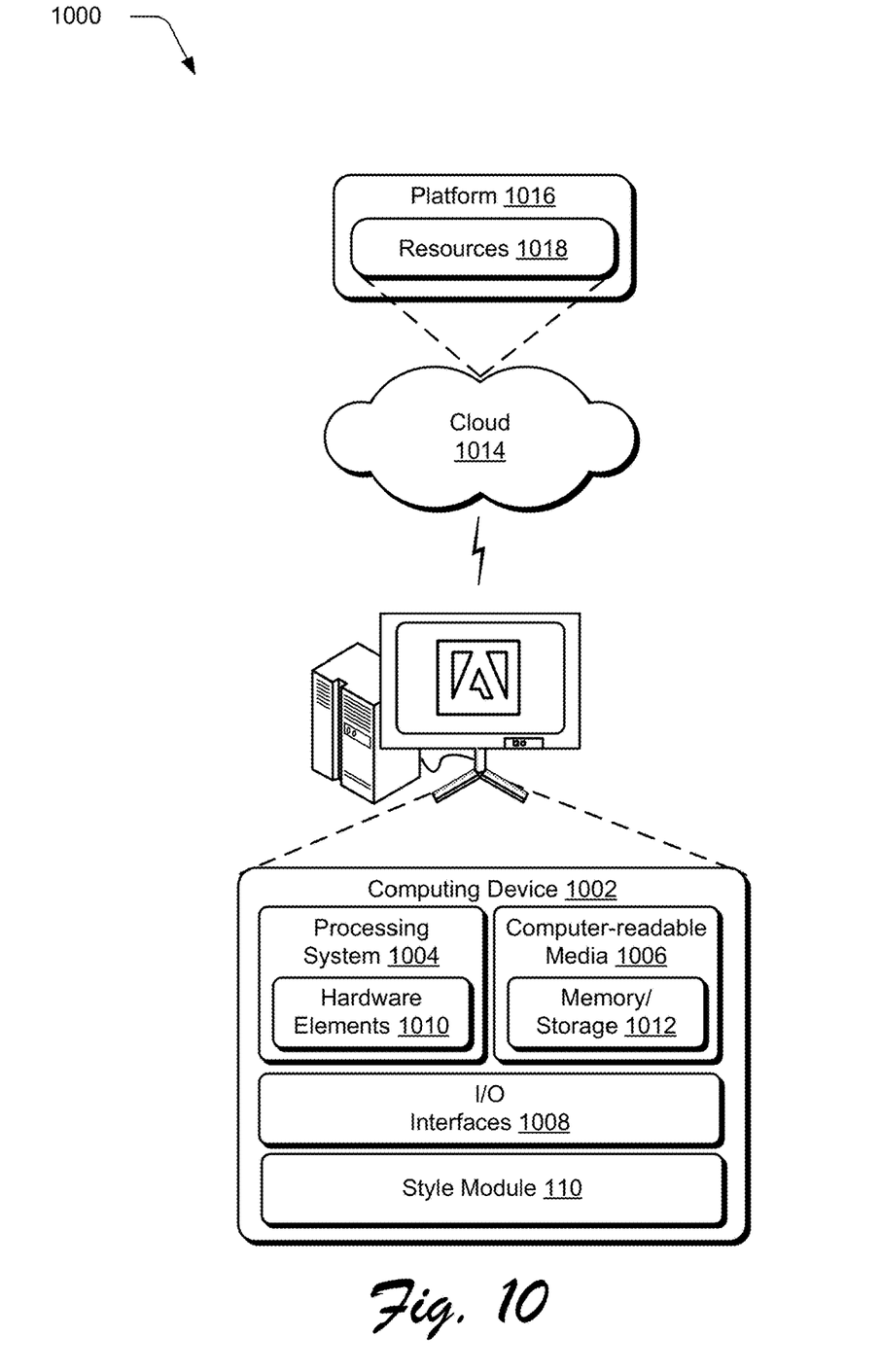
FIG. 10 illustrates an example system that includes an example computing device that is representative of one or more computing systems and/or devices for implementing the various techniques described herein.

FIG. 10 illustrates an example system 1000 that includes an example computing device that is representative of one or more computing systems and/or devices that are usable to implement the various techniques described herein. This is illustrated through inclusion of the style module 110. The computing device 1002 includes, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that are configured as processors, functional blocks, and so forth. This includes example implementations in hardware as an application specific integrated circuit or other logic device formed using one or more semiconductors. The hardware elements 1010 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1006 is illustrated as including memory/storage 1012. The memory/storage 1012 represents memory/storage capacity associated with one or more computer-readable media. In one example, the memory/storage 1012 includes volatile media (such as random access memory (RAM)) and/or nonvolatile media (such as read only memory (ROM), Flash memory, optical disks, magnetic disks, and so forth). In another example, the memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1010. For example, the computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supportable by various configurations of the computing device 1002 and are not limited to the specific examples of the techniques described herein. This functionality is also implementable entirely or partially through use of a distributed system, such as over a "cloud" 1014 as described below.

The cloud 1014 includes and/or is representative of a platform 1016 for resources 1018. The platform 1016 abstracts underlying functionality of hardware (e.g., servers) and software resources of the cloud 1014. For example, the resources 1018 include applications and/or data that are utilized while computer processing is executed on servers that are remote from the computing device 1002. In some examples, the resources 1018 also include services provided over the Internet and/or through a subscriber network, such as a cellular or Wi-Fi network.

The platform 1016 abstracts the resources 1018 and functions to connect the computing device 1002 with other computing devices. In some examples, the platform 1016 also serves to abstract scaling of resources to provide a corresponding level of scale to encountered demand for the resources that are implemented via the platform. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

What is claimed is:

1. A method comprising:
receiving, by a processing device, input data describing digital content to be stylized based on visual styles of example content included in a digital template;
generating, by the processing device using a machine learning model, embeddings that capture context between content entities included in the digital content;
determining, by the processing device using the machine learning model, classified content entities based on the context captured in the embeddings; and
generating, by the processing device, an output digital template that includes portions of the digital content having the visual styles of example content included in the digital template that have classifications based on classifications of the classified content entities.

2. The method as described in claim 1, wherein the portions of the digital content include at least one of text, a table, a digital image, or a vector object.

3. The method as described in claim 1, wherein the digital content described by the input data is not formatted.

4. The method as described in claim 1, wherein the content entities include at least one of a sentence or a paragraph.

5. The method as described in claim 1, wherein the output digital template includes additional portions of the digital content having visual styles included in a style package that defines appearance properties for categories of digital content.

6. The method as described in claim 5, wherein the categories of digital content include at least one of text, tables, digital images, or vector objects.

7. The method as described in claim 1, wherein the machine learning model is a transformer-over-transformer model.

8. The method as described in claim 1, wherein the classified content entities are classified as at least one of a heading, a body, or a list.

9. A system comprising:
a memory component; and
a processing device coupled to the memory component, the processing device to perform operations comprising:
receiving input data describing digital content to be stylized based on visual styles included in a style package that defines appearance properties for categories of digital content;
generating embeddings that capture context between content entities included in the digital content using a machine learning model;
determining classified content entities based on the context captured in the embeddings using the machine learning model; and
generating a digital template that includes portions of the digital content having the visual styles included in the style package that have classifications based on classifications of the classified content entities.

10. The system as described in claim 9, wherein the visual styles included the style package are extracted from visual styles of example content included in an additional digital template.

11. The system as described in claim 9, wherein the machine learning model is a transformer-over-transformer model.

12. The system as described in claim 9, wherein a visual style included in the style package is based on a font and defined appearance properties for glyphs of text rendered using the font.

13. The system as described in claim 12, wherein the defined appearance properties for glyphs of text include at least one of a size or a color.

14. The system as described in claim 9, wherein the categories of digital content include at least one of text, tables, digital images, or vector objects.

15. A non-transitory computer-readable storage medium storing executable instructions, which when executed by a processing device, cause the processing device to perform operations comprising:
receiving input data describing digital content to be stylized based on visual styles of example content included in a digital template;
generating embeddings that capture context between content entities included in the digital content using a machine learning model;
determining classified content entities based on the context captured in the embeddings using the machine learning model; and
generating an output digital template that includes portions of the digital content having the visual styles of example content included in the digital template that have classifications based on classifications of the classified content entities.

16. The non-transitory computer-readable storage medium as described in claim 15, wherein the content entities include at least one of a sentence or a paragraph.

17. The non-transitory computer-readable storage medium as described in claim 15, wherein the classified content entities are classified as at least one of a heading, a body, or a list.

18. The non-transitory computer-readable storage medium as described in claim 15, wherein the digital content described by the input data is not formatted.

19. The non-transitory computer-readable storage medium as described in claim 15, wherein the machine learning model is a transformer-over-transformer model.

20. The non-transitory computer-readable storage medium as described in claim 15, wherein the machine learning model includes a first machine learning model trained to generate the embeddings, and a second machine learning model trained to determine the classified content entities based on the embeddings generated by the first machine learning model.

* * * * *